(12) United States Patent
Nandi et al.

(10) Patent No.: US 9,739,063 B2
(45) Date of Patent: *Aug. 22, 2017

(54) ROOFING SYSTEMS AND ROOFING BOARDS WITH NON-HALOGENATED FIRE RETARDANT

(71) Applicant: JOHNS MANVILLE, Denver, CO (US)

(72) Inventors: Malay Nandi, Littleton, CO (US); Lance Wang, Littleton, CO (US); Jawed Asrar, Englewood, CO (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/233,552

(22) Filed: Aug. 10, 2016

(65) Prior Publication Data

US 2016/0348356 A1 Dec. 1, 2016

Related U.S. Application Data

(63) Continuation of application No. 14/299,631, filed on Jun. 9, 2014, now Pat. No. 9,528,269.

(51) Int. Cl.
  C08G 18/72 (2006.01)
  E04D 11/02 (2006.01)
  (Continued)

(52) U.S. Cl.
  CPC .............. *E04D 11/02* (2013.01); *B32B 5/245* (2013.01); *B32B 11/046* (2013.01); *B32B 27/06* (2013.01);
  (Continued)

(58) Field of Classification Search
  CPC ...... C08J 9/0038; C08G 18/791; E04D 13/16; E04D 12/002; E04C 2/44; B32B 2419/00;
  (Continued)

(56) References Cited

U.S. PATENT DOCUMENTS 2,579,810 A  12/1951 Fields
2,593,213 A   4/1952 Stiles
(Continued)

FOREIGN PATENT DOCUMENTS

CA  1085998 A1   9/1980
CA  2246634 A1  10/1998
(Continued)

OTHER PUBLICATIONS

Ivanov et al, "Reaction in the System Trialkyl Phosphite-Carboxamide or Secondary Amine," Bulletin of the Academy of Sciences of the USSR, Division of Chemical Science, Dec. 1971, pp. 2629-2632, vol. 20, No. 12.
(Continued)

*Primary Examiner* — Adriana Figueroa
(74) *Attorney, Agent, or Firm* — Robert D. Touslee

(57) ABSTRACT

According to one embodiment, a halogen free roof system is described. The roof system includes a structural deck that is positioned above joists or other support members. Polyisocyanurate foam insulation is positioned atop the structural deck. The polyisocyanurate foam insulation has an isocyanate index greater than 200 and includes a polyisocyanurate core having a halogen free fire retardant. A water proof membrane is positioned atop the polyisocyanurate foam insulation. The polyisocyanurate core is able to form a sufficiently stable char when exposed to flame conditions such that the polyisocyanurate core is able to pass the ASTM E-84 test.

21 Claims, 3 Drawing Sheets

(51) Int. Cl.

| | | |
|---|---|---|
| *E04B 2/00* | (2006.01) | |
| *E04D 12/00* | (2006.01) | |
| *C08G 18/79* | (2006.01) | |
| *C08J 9/00* | (2006.01) | |
| *E04D 13/16* | (2006.01) | |
| *C08J 9/14* | (2006.01) | |
| *C08G 18/28* | (2006.01) | |
| *C08G 18/42* | (2006.01) | |
| *B32B 5/24* | (2006.01) | |
| *B32B 11/04* | (2006.01) | |
| *B32B 27/30* | (2006.01) | |
| *B32B 27/32* | (2006.01) | |
| *B32B 27/06* | (2006.01) | |
| *B32B 27/18* | (2006.01) | |
| *C08G 18/08* | (2006.01) | |
| *E04B 1/94* | (2006.01) | |
| *E04C 2/20* | (2006.01) | |
| *E04D 5/06* | (2006.01) | |
| *C08G 101/00* | (2006.01) | |

(52) U.S. Cl.
CPC ........... *B32B 27/18* (2013.01); *B32B 27/30* (2013.01); *B32B 27/304* (2013.01); *B32B 27/32* (2013.01); *C08G 18/14* (2013.01); *C08G 18/288* (2013.01); *C08G 18/42* (2013.01); *C08G 18/72* (2013.01); *C08G 18/791* (2013.01); *C08J 9/0023* (2013.01); *C08J 9/0038* (2013.01); *C08J 9/0061* (2013.01); *C08J 9/0095* (2013.01); *C08J 9/141* (2013.01); *E04B 1/942* (2013.01); *E04C 2/205* (2013.01); *E04C 2/44* (2013.01); *E04D 5/06* (2013.01); *E04D 12/002* (2013.01); *E04D 13/16* (2013.01); *E04D 13/1643* (2013.01); *B32B 2262/101* (2013.01); *B32B 2307/304* (2013.01); *B32B 2307/3065* (2013.01); *B32B 2307/558* (2013.01); *B32B 2307/7265* (2013.01); *B32B 2419/00* (2013.01); *B32B 2419/06* (2013.01); *C08G 2101/00* (2013.01); *C08G 2105/02* (2013.01); *C08G 2330/00* (2013.01); *C08J 2203/14* (2013.01); *C08J 2207/00* (2013.01); *C08J 2375/06* (2013.01); *C08J 2375/08* (2013.01); *C08J 2483/12* (2013.01); *E04B 2103/04* (2013.01); *Y10T 428/24999* (2015.04); *Y10T 428/249953* (2015.04); *Y10T 428/249987* (2015.04); *Y10T 428/249993* (2015.04)

(58) Field of Classification Search
CPC .......... B32B 2419/06; B32B 2307/558; B32B 2307/7265; B32B 2307/304; B32B 2262/101; B32B 2307/3065
See application file for complete search history.

(56) References Cited

U.S. PATENT DOCUMENTS

| | | |
|---|---|---|
| 3,102,900 A | 9/1963 | Fields |
| 3,179,522 A | 4/1965 | Ternin |
| 3,382,301 A | 5/1968 | Hechenbleikneret et al. |
| 3,385,801 A | 5/1968 | Birum et al. |
| 3,609,107 A | 9/1971 | Boyer et al. |
| 3,644,232 A | 2/1972 | Bernard et al. |
| 3,746,572 A | 7/1973 | Weil et al. |
| 3,969,437 A | 7/1976 | Shim |
| 3,994,839 A | 11/1976 | Cenker et al. |
| 4,024,207 A | 5/1977 | Biehler et al. |
| 4,039,487 A | 8/1977 | Kolakowski et al. |
| 4,067,833 A | 1/1978 | Austin et al. |
| 4,077,964 A | 3/1978 | Lecolier et al. |
| 4,085,283 A | 4/1978 | den Otter et al. |
| 4,101,472 A | 7/1978 | Biehler et al. |
| 4,113,671 A | 9/1978 | Lecolier et al. |
| 4,205,136 A | 5/1980 | Ohashi et al. |
| 4,219,508 A | 8/1980 | Wagner |
| 4,417,001 A | 11/1983 | Svoboda et al. |
| 4,426,461 A | 1/1984 | Smith |
| 4,444,913 A | 4/1984 | Smith |
| 4,455,397 A | 6/1984 | Reichel et al. |
| 4,521,547 A | 6/1985 | Anderson |
| 4,681,965 A | 7/1987 | Speranza et al. |
| 4,697,030 A | 9/1987 | Hardy et al. |
| 4,774,268 A | 9/1988 | Marx et al. |
| 4,808,744 A | 2/1989 | Hardy et al. |
| 4,820,854 A | 4/1989 | Hardy et al. |
| 4,883,891 A | 11/1989 | Hardy et al. |
| 4,883,892 A | 11/1989 | Hardy et al. |
| 4,886,895 A | 12/1989 | Hardy et al. |
| 4,996,241 A | 2/1991 | Eling et al. |
| 5,055,458 A | 10/1991 | Bailey et al. |
| 5,097,057 A | 3/1992 | Hardy et al. |
| 5,102,918 A | 4/1992 | Moriya |
| 5,108,994 A | 4/1992 | Harnden et al. |
| 5,117,033 A | 5/1992 | Hardy et al. |
| 5,223,551 A | 6/1993 | Gattuso et al. |
| 5,272,128 A | 12/1993 | Rosen et al. |
| 5,891,563 A | 4/1999 | Letts |
| 5,952,327 A | 9/1999 | Waldeck et al. |
| 5,981,612 A | 11/1999 | Keppeler et al. |
| 8,198,341 B2 | 6/2012 | Stowell et al. |
| 8,287,997 B2 | 10/2012 | Paradis et al. |
| 9,169,278 B2 | 10/2015 | Stowell et al. |
| 9,187,504 B2 | 11/2015 | Stowell et al. |
| 2004/0082465 A1 | 4/2004 | Kiso et al. |
| 2006/0053718 A1 | 3/2006 | Kelly |
| 2006/0167145 A1 | 7/2006 | Tokuyasu et al. |
| 2007/0043132 A1 | 2/2007 | Kiso et al. |
| 2007/0112084 A1 | 5/2007 | Hansel et al. |
| 2007/0112085 A1 | 5/2007 | Tokumoto et al. |
| 2008/0203348 A1 | 8/2008 | Laoutid et al. |
| 2008/0234402 A1 | 9/2008 | Lehmann et al. |
| 2009/0247657 A1 | 10/2009 | Kaplan et al. |
| 2009/0281205 A1 | 11/2009 | Piotrowski et al. |
| 2010/0031603 A1 | 2/2010 | Letts et al. |
| 2010/0120930 A1 | 5/2010 | Layman, Jr. et al. |
| 2010/0160468 A1 | 6/2010 | Stowell et al. |
| 2011/0047908 A1 | 3/2011 | Brusman et al. |
| 2011/0230577 A1 | 9/2011 | Zhao et al. |
| 2011/0257287 A1 | 10/2011 | Stowell et al. |
| 2013/0243991 A1 | 9/2013 | McGuire |
| 2014/0066532 A1 | 3/2014 | Combs et al. |
| 2014/0094530 A1 | 4/2014 | Combs et al. |
| 2014/0130435 A1 | 5/2014 | Paradis et al. |
| 2014/0309321 A1 | 10/2014 | Stowell et al. |
| 2015/0080487 A1 | 3/2015 | Stowell et al. |
| 2015/0329691 A1* | 11/2015 | Skowronski ........... C08J 9/0038 521/131 |

FOREIGN PATENT DOCUMENTS

| | | |
|---|---|---|
| CN | 101619076 A | 1/2010 |
| CN | 102585148 A | 7/2012 |
| EP | 0409181 A2 | 7/1990 |
| EP | 0570706 A1 | 4/1993 |
| EP | 0 719 807 A2 | 7/1998 |
| EP | 0 908 464 A1 | 4/1999 |
| EP | 2 500 368 A2 | 9/2012 |
| FR | 2 335 516 A1 | 7/1997 |
| GB | 0682706 A | 11/1952 |
| GB | 1420543 A | 1/1976 |
| JP | 11140150 A | 5/1999 |
| JP | 2002121252 A | 4/2002 |
| JP | 2003089714 A | 3/2003 |
| WO | 81 01816 A1 | 7/1981 |

(56) References Cited

FOREIGN PATENT DOCUMENTS

| WO | 2006 084134 A1 | 8/2006 |
| WO | 2014056138 A1 | 4/2014 |
| WO | 2014062313 A1 | 4/2014 |

OTHER PUBLICATIONS

Gajewak et al, "Synthesis and Molecular Recognition of Phosphatidylinositol-3-Methylenephosphate," Organic Letters. Jun. 22, 2006, pp. 2811-2813, vol. 8, No. 13, American Chemical Society.

West Virginia Department of Environmental Protection, Division of Air Quality, Title V Fact Sheet R30-05300007-2010 (MM09) Dec. 10, 2013; Permitee: ICL-IP America Inc.; Facility Gallipolis Ferry, West Virginia.

EverGuard TPO/PVC Mechanically Attached Roofing System Overview & General Requirements Manual, title page—p. 65, 2012, GAF.com.

* cited by examiner

ROOFING SYSTEMS AND ROOFING BOARDS WITH NON-HALOGENATED FIRE RETARDANT

CROSS-REFERENCES TO RELATED APPLICATIONS

This application is a continuation of U.S. application Ser. No. 14/299,631 filed Jun. 9, 2014.

BACKGROUND OF THE INVENTION

Polyisocyanurate foam (i.e., PIR board stock) has been widely used to insulate roofs and walls of commercial and industrial buildings for many decades due to its excellent thermal insulation, flame resistance, and mechanical properties. The main reason for its excellent flame resistance is the formation of isocyanurate trimer during the foaming process. However, in order to pass the fire tests required by building code, such as the ASTM E-84 test, extra fire retardants are still needed. Halogenated fire retardants, such as TCPP (tris(2-chloroisopropyl)phosphate), are commonly used in PIR board stock. Halogenated fire retardants, especially TCPP, are very effective fire retardants due to their dual functions of gas phase radical scavenging and char formation in the solid phase. However, some insulation specifiers have expressed an interest in using materials which do not contain TCPP or other halogenated fire-retardants.

BRIEF SUMMARY OF THE INVENTION

The embodiments described herein provide polyisocyanurate foam products, and particularly polyisocyanurate foam roofing boards, that include a non-halogenated fire retardant. According to one aspect, a roof system is described. The roof system includes a structural deck that is positioned atop joists or other support members of the roof system. A plurality of polyisocyanurate foam insulation boards are positioned atop the structural deck to form an insulation layer for the roof system. Each polyisocyanurate foam insulation board has an isocyanate index greater than 200. A water proof membrane is positioned atop the plurality of polyisocyanurate foam insulation boards to form a water proof layer for the roof system.

Each polyisocyanurate foam insulation board includes a polyisocyanurate core that is produced from: an isocyanate, a polyol, and at least one phosphorus containing non-halogenated fire retardant. The polyisocyanurate core is able to form a sufficiently stable char when exposed to flame conditions in accordance with ASTM E-84. The stable char enables the polyisocyanurate core to pass the ASTM E-84 test. The polyisocyanurate foam insulation boards have an initial R-value of at least 6.4 and exhibit an ASTM E1354-11b performance that is equivalent with or better than a similar polyisocyanurate foam insulation board having a halogenated fire retardant tris(2-chloroisopropyl)phosphate (TCPP).

In some embodiments, a plurality of cover boards are positioned between the plurality of polyisocyanurate foam insulation boards and the water proof membrane to form a protective layer for the roof system. In such embodiments, some, most, or each cover board may include a polyisocyanurate core that is produced from: an isocyanate, a polyol, and at least one phosphorus containing non-halogenated fire retardant.

In some embodiments, the polyisocyanurate core may also include between 5 and 10 weight percent of a hydrocarbon blowing agent. Each foam insulation board may further include a glass fiber mat facer that is attached to at least one surface of the board, and often both surfaces of the board. The water proof membrane may include: a built-up roof, modified bitumen, thermoplastic olefin (TPO), polyvinyl chloride (PVC), ethylene propylene diene monomer (EPDM), metal, and the like.

The phosphorus containing non-halogenated fire retardant may include: an organo-phosphate, an organo-phosphite, and/or an organo-phosphonate. In an exemplary embodiment, the phosphorous containing non-halogenated fire retardant is isocyanate reactive, such as diethyl hydroxymethyl phosphonate (DEHMP). The polyisocyanurate core may have an average foam cell size of no more than 200 microns and/or each foam insulation board may have a density of between about 1.5 and 2.5 pcf.

According to another aspect, a method of forming a roof system is described. The method includes positioning a structural deck atop joists or other support members of the roof system and positioning a plurality of polyisocyanurate foam insulation boards atop the structural deck to form an insulation layer for the roof system. The method also includes positioning a water proof membrane atop the plurality of polyisocyanurate foam insulation boards to form a water proof layer for the roof system. As described herein, each polyisocyanurate foam insulation board includes a polyisocyanurate core that is produced from: an isocyanate, a polyol, and at least one phosphorus containing non-halogenated fire retardant. The polyisocyanurate core forms a sufficiently stable char when exposed to flame conditions in accordance with ASTM E-84 that enables the polyisocyanurate core to pass the ASTM E-84 test. The polyisocyanurate foam insulation boards have an initial R-value of at least 6.4 and exhibit an ASTM E1354-11b performance that is equivalent with or better than a similar polyisocyanurate foam insulation board having a halogenated fire retardant tris(2-chloroisopropyl)phosphate (TCPP).

In some embodiments, the method may further include positioning a plurality of cover boards atop the plurality of polyisocyanurate foam insulation boards to form a protective layer for the roof system. In such embodiments, each, some, or most of the cover boards may include a polyisocyanurate core that is produced from: an isocyanate, a polyol, and at least one phosphorus containing non-halogenated fire retardant. In some embodiments, the method may additionally include attaching a glass fiber mat facer to at least surface of the polyisocyanurate core and often to opposing surfaces (e.g., top and bottom surfaces) of the polyisocyanurate core.

According to another aspect, a halogen free roof system is described. The halogen free roof system includes a structural deck, polyisocyanurate foam insulation that is positioned atop the structural deck, and a water proof membrane that is positioned atop the polyisocyanurate foam insulation. The polyisocyanurate foam insulation has an isocyanate index greater than 200 and includes a polyisocyanurate core having a halogen free fire retardant. The polyisocyanurate core is able to form a sufficiently stable char when exposed to flame conditions in accordance with ASTM E-84 such that the polyisocyanurate core passes the ASTM E-84 test.

In some embodiments, a coverboard is positioned atop the polyisocyanurate foam insulation. In such embodiments, the coverboard includes a halogen free fire retardant and/or a polyisocyanurate foam core. The water proof membrane may include: built-up roof, modified bitumen, thermoplastic olefin (TPO), ethylene propylene diene monomer (EPDM), and/or metal.

The polyisocyanurate foam insulation may include between 5 and 10 weight percent of a hydrocarbon blowing agent. The halogen free fire retardant may include a phosphorous containing non-halogenated fire retardant. In an exemplary embodiment, the phosphorous containing non-halogenated fire retardant may include diethyl hydroxymethyl phosphonate (DEHMP). The polyisocyanurate core may have an average foam cell size of about 125 microns.

BRIEF DESCRIPTION OF THE DRAWINGS

The present invention is described in conjunction with the appended figures.

Figure 1:
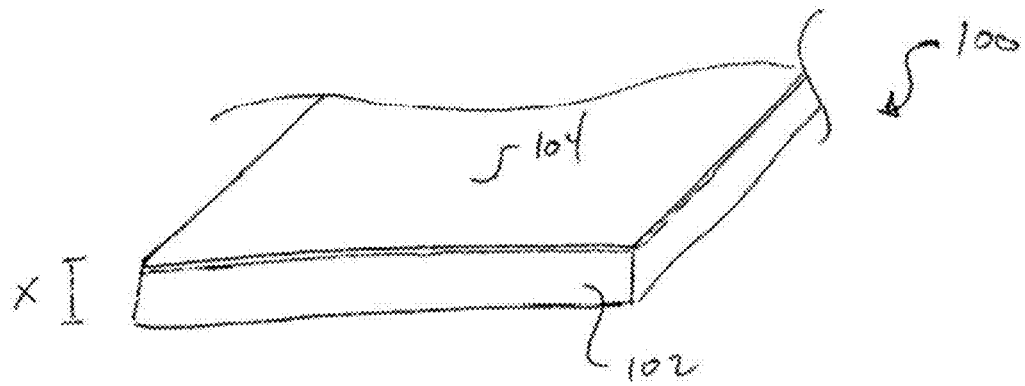
FIG. 1 illustrates an embodiment of a polyisocyanurate foam board.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

The description and/or claims herein may use relative terms in describing features and/or aspects of the embodiments. For example, the description and/or claims may use terms such as relatively, about, substantially, approximately, and the like. These relative terms are meant to account for deviations that may be appreciated or accepted in the art. For example, the description and/or claims may describe the wall or roof system being substantially free of halogen. Such a description implies that each or most of the wall system components is free of a halogen fire retardant while recognizing the some of the components may include a very small and/or negligible amount of halogen. Likewise, the disclosure herein may describe the components of the wall or roof system being substantially continuous. Such a description implies that the components may be assembly and/or attached so that a layer of the component or material is essentially continuous while recognizing that some interruptions from a fully continuous surface or layer, or other minor irregularities, may be present. The relative terms used herein may account for deviations from uniform that may appreciated and/or accepted by those skilled in the art. These deviations may be up to about 10%, but are typically less than 5% and often less than about 3%.

The embodiments described herein provide polyisocyanurate foam products, and particularly polyisocyanurate foam boards, that include a non-halogenated fire retardant. The embodiments described herein also provide wall and roofing systems that include the polyisocyanurate foam products. The embodiments demonstrate similar or better fire performances in ASTM E-84 and/or ASTM E1354 tests when compared to similar foam products that contain a halogenated fire retardant (e.g., tris(2-chloroisopropyl)phosphate (TCPP)). In some embodiments, the polyisocyanurate foam may be a polyurethane modified polyisocyanurate due to the presence of urethane/urea linkages in the foam.

Exemplary polyfunctional isocyanates that may form substituted or unsubstituted polyisocyanates that are used to make the polyisocyanurate foam boards and other foam products include aromatic, aliphatic, and cycloaliphatic polyisocyanates having at least two isocyanate functional groups. Exemplary aromatic polyfunctional isocyanates include: 4,4'-diphenylmethane diisocyanate (MDI), polymeric MDI (PMDI), toluene disisocyanate, and allophanate modified isocyanate. For example, the polyfunctional isocyanate may be PMDI with functionality between 2.3 to 3.0, viscosity less at 800 cps at 25, and isocyanate content between 28% to 35%.

The polyfunctional isocyanates may be reacted with a polyfunctional co-reactant that has at least two reactive groups that react with the polyfunctional isocyanate to produce a polyisocyanurate compounds for the present products. Exemplary polyfunctional co-reactants may include polyester and polyether polyols having at least 2 isocyanate reactive groups, such as hydroxyl groups. Specific examples include aromatic polyester polyols which have good mechanical properties, as well as hydrolytic and thermo-oxidative stability. Commercially available polyester polyol include those sold by Stepan Company under the name Stepanol® and those sold by Huntsman Corporation under the name of Terol®. Exemplary polyols may have a functionality between 2 and 2.5 and hydroxyl number between 150 mg KOH/gm and 450 mg KOH/gm.

The catalysts used to polymerize the polyisocyanurates may include amine catalysts and metal catalysts, among other catalysts. The amine catalysts catalyze both urethane reactions between isocyanates and polyols, and urea reactions between water and isocyanates. The metal catalysts may include metal carboxylate trimer catalysts, which promote the conversion of isocyanate to highly thermally stable isocyanurate ring. Examples of suitable amine catalysts include pentamethyldiethylenetriamine (PMDETA), dimethylcyclohexylamine, and 1,3,5-tris(3-(dimethylamino)propyl)-hexahydro-triazine. Examples of suitable metal catalysts include potassium octoate and potassium acetate.

The present polyisocyanurate formulations may also include one or more surfactants. The surfactants function to improve compatibility of the formulation components and stabilize the cell structure during foaming. Exemplary surfactants can include organic or silicone based materials. Typical silicone based surfactants may include polyether modified polysiloxane, such as commercially available DC193 surfactant from AirProducts, and Tergostab® series surfactants from Evonik, such as Tergostab® 8535.

The ASTM E-84 tunnel test is a common fire test that is required for plastic foam insulation boards used in either wall or roof insulation systems. The test requires removing any facer products from the insulation boards and measuring the flame spread and smoke density that is generated by the foam core in response to exposure to a flame. Most polyurethane/polyisocyanurate foam insulation boards can only pass this test by using halogenated fire retardants. The halogenated fire retardants enable the insulation boards to pass this test due to the fire retardants dual function of gas phase radical scavenging and char formation in the solid phase.

It is therefore surprising to discover that the polyisocyanurate foam insulation boards described herein that include a non-halogenated fire retardant exhibit a similar or better fire-retardant performance in relation to the ASTM E-84 and ASTM E1354-11 b tests than convention insulation boards that include a halogenated fire retardant (e.g., TCPP). The observed increase in fire-retardant performance may be due to an ability of the polyisocyanurate foam insulation forming a sufficiently stable char such that the use of a halogenated fire retardant becomes unnecessary. The non-halogenated fire retardants used in the embodiments described herein may be blend of organa phosphorus compounds including: organo-phosphate, organo-phosphite, and/or organo-phosphonate. The non-halogenated organa phosphorus fire retardant could be non-reactive or reactive, i.e. containing isocyanate reactive functionality. An exemplary non-reactive organa phosphorus fire retardant is a blend of butyl diphenyl phosphate, dibutyl phenyl phosphate, and triphenyl phosphate. An exemplary reactive organ phosphorus fire retardant is diethyl hydroxylmethyl phosphonate (DEHMP).

Exemplary Foam Boards

Referring now to FIG. 1, illustrated is an embodiment of a polyisocyanurate foam board 100 (hereinafter foam board 100). The foam board 100 includes a polyisocyanurate core 102 that is produced from an isocyanate, a polyol, and at least one phosphorous containing non-halogenated fire retardant (e.g., a non-halogenated isocyanate reactive phosphorus compound).

The polyol typically includes either or both a polyether and polyester having a hydroxyl number between about 25 and 500, and more commonly between about 200 and 270. The hydroxyl number is a measure of the concentration of the hydroxyl group in the polyol, which is expressed as the milligrams of KOH (potassium hydroxide) equivalent to the hydroxyl groups in one gram of polyol. Polyether is commonly not used in conventional polyisocyanurate foam boards because it is typically less flame resistant than the aromatic polyester that is used in such boards. A lower hydroxyl number commonly results in longer polymer chains and/or less cross linking, which results in a relatively loose polymer chain. In contrast, a higher hydroxyl number commonly results in more cross linking and/or shorter polymer chains, which may provide enhanced mechanical properties and/or flame resistance.

The polyisocyanurate core 102 has an isocyanate index greater than about 200, commonly between about 200 and 300, and more commonly between about 250 and 270. When isocyanate reacts with one or more polyols to form polyurethane, one NCO group reacts with one OH group. As is known in the art, the index is defined as the ratio of NCO group to OH group multiplied by 100 as shown in the formula below:

$$\text{Index} = \frac{\text{Moles of NCO group}}{\text{Moles of OH group}} \times 100$$

When the number of NCO group equals the number of OH group in a formulation, a stoichiometric NCO:OH ratio of 1.0 is realized and a polyurethane polymer/foam is produced. When the number of NCO groups is significantly more than the number of OH groups in a formulation, the excess isocyanate group reacts with itself under catalytic condition to form isocyanurate linkage and polyisocyanurate foam is produced. The above described isocyanate index, and especially an index of between about 250 and 270, provides at least a 2:1 ratio of NCO groups to OH groups, which has been found to provide an appreciable combination of structure integrity, thermal strength and/or stability, and fire resistance.

The above described index values also typically require less fire retardant materials to be used to enable passing of the ASTM E-84 and/or ASTM E1354-11 b tests. For example, conventional polyisocyanurate foam insulation boards having an isocyanate index of less than 200 commonly require the application or use of significantly more fire retardant materials to enable these products to pass the ASTM E-84 and/or ASTM E1354-11 b tests. In some embodiments, the polyisocyanurate core 102 may include between about 2 and 5 weight percent of the phosphorous containing non-halogenated fire retardant. Conventional polyisocyanurate boards typically include between about 3 to 4% of a halogenated fire retardant, such as TCPP.

In some embodiments, the non-halogenated phosphorus containing fire retardant is isocyanate reactive. In some embodiments, the phosphorous containing non-halogenated fire retardant includes: an organo-phosphate, an organo-phosphite, and/or an organo-phosphonate. In an exemplary embodiment, the phosphorous containing non-halogenated fire retardant includes diethyl hydroxymethyl phosphonate (DEHMP). In other embodiments, the phosphorous containing non-halogenated fire retardant may include: dialkyl hydroxyalkanephosphonate (e.g., dimethyl hydroxymethylphosphonate), diaryl hydroxyalkanephosphonate (e.g., diphenyl hydroxymethylphosphonate), and the like.

The polyisocyanurate core is able to form a sufficiently stable char when exposed to flame conditions in accordance with an ASTM E-84 that enables the polyisocyanurate core to pass the ASTM E-84 test. The non-halogenated phosphorus compound promotes charring in the solid phase, which reduce the fuel supply to the flame and effectively decrease the temperature of the flame that may further decompose the polymer. The polyisocyanurate core 102 typically has an average foam cell size of less than about 200 microns, and more commonly between about more commonly 100-150. In contrast, conventional foam boards typically have an average foam cell size of between about 200 and 300. The smaller foam cell size of the polyisocyanurate core 102 may enable the resulting foam board to exhibit an increased R-value when compared with conventional foam boards.

In some embodiments, the polyisocyanurate core 102 may include between 1 and 10 weight percent of a hydrocarbon blowing agent, such as n-pentane, iso-pentane, cyclopentane, and their blends. In an exemplary embodiment, the polyisocyanurate core 102 may include between 5 and 8 weight percent of the hydrocarbon blowing agent. The weight percent of the hydrocarbon blowing agent typically corresponds with the foam density of the polyisocyanurate core 102 with lower density foam boards (e.g., insulation boards) having a higher weight percentage of the hydrocarbon blowing agent than more dense foam boards (e.g., roofing cover boards). For example, insulation boards having a density of between about 1.5 and 2.5 pounds per cubic foot ($lbs/ft^3$), commonly have 5% or more of a hydrocarbon blowing agent by weight, and more commonly between about 6 and 7 weight percent. In contrast, roofing cover boards that have a density of up to 10 $lbs/ft^3$, and more commonly between 6 and 7 $lbs/ft^3$, commonly have less than 5% of a hydrocarbon blowing agent by weight, and more commonly between about 1.5 and 3 weight percent.

Hydrocarbon blowing agents, such as n-pentane, isopentane, cyclopentane, and their blends, are extremely flammable materials (i.e., materials that commonly have a Lower Explosive Limit (LEL) of less than 2% in air) that negatively contribute to a polyisocyanurate foam board's fire resistance. For example, n-pentane, isopentane, and cyclopentane have LEL values of 1.5%, 1.4%, and 1.1% at 20° C. and 1 atmosphere of pressure, respectively. Stated differently, the hydrocarbon blowing agents typically reduce the fire resistance of the polyisocyanurate foam board by providing a fuel source that feeds a fire. As a result, conventional polyisocyanurate foam boards that use hydrocarbon blowing agents are typically unable to pass the ASTM E-84 and/or ASTM E1354-11 b tests without the use of halogenated fire retardants. Some conventional polyisocyanurate foam boards that do not require a halogenated fire retardant have passed the above tests, but are only able to do so by greatly reducing the amount of hydrocarbon blowing agents used and/or by using alternative blowing agents that are significantly less flammable. Hydrocarbon blowing agents are typically less expensive and offer a good thermal insulation value. Other blowing agents, such as Methyl Formate, are commonly more expensive and/or pose other problems, such as the formation of formic acid (i.e., from Methyl Formate), which may present problems associated with corrosion.

In some embodiments, the polyisocyanyurate foam boards described herein only include or use an extremely/highly flammable hydrocarbon agent, such as those described above. Stated differently, the polyisocyanyurate foam boards do not include or use alternative blowing agents that are significantly less flammable and/or do not include or use a combination of an extremely flammable hydrocarbon agent and a less flammable alternative blowing agent. The alternative less flammable blowing agents may include one or more materials or components having a relatively significant ozone depleting potential. As such, these blowing agents may contribute to global warming to a greater degree than the extremely/highly flammable hydrocarbon agents and therefore, may be less desirable despite their decreased flammability. In some embodiments, the polyisocyanyurate foam boards described herein substantially include or use an extremely flammable hydrocarbon agent, such as those described above, but may have some insignificant or minor amount of another material that may be considered a less flammable alternative blowing agent.

In contrast to these conventional systems, the phosphorous containing non-halogenated fire retardants described herein (e.g., DEHMP), enable the resulting polyisocyanurate foam boards to pass the ASTM E-84 and/or ASTM E1354-11 b tests even when a substantial amount of a highly flammable hydrocarbon blowing agent is used—e.g., a blowing agent having an LEL of less than 2% in air. In some embodiments, the blowing agent used may only or substantially include a highly flammable hydrocarbon blowing agent (e.g., a blowing agent having an LEL of less than 2% in air), although in other embodiments the blowing agent used may be a combination of a highly flammable hydrocarbon blowing agent and a less flammable hydrocarbon blowing agent.

The above blowing agents may be used regardless of the foam density of the resulting polyisocyanurate foam board. For example, a lower density foam insulation board (i.e., foam density of between 1.5 and 2.5 $lbs/ft^3$, and more commonly between 1.6 and 1.8 $lbs/ft^3$) may include a blowing agent that only includes a highly flammable hydrocarbon blowing agent (e.g., a blowing agent having an LEL of less than 2% in air), or may include a combination of a highly flammable hydrocarbon blowing agent and a less flammable hydrocarbon blowing agent. A higher density foam cover board (i.e., foam density of up to 10 $lbs/ft^3$, and more commonly between 6 and 7 $lbs/ft^3$) may likewise include a blowing agent that only includes a highly flammable hydrocarbon blowing agent (e.g., a blowing agent having an LEL of less than 2% in air), or may include a combination of a highly flammable hydrocarbon blowing agent and a less flammable hydrocarbon blowing agent.

Foam board 100 also includes a facer material 104 that is applied to at least one surface of the polyisocyanurate core 102. The facer material 104 typically includes a glass fiber mat, but may include other types of facer materials. The facer material 104 is typically selected based on the type of polyisocyanurate foam board produced. For example, facers for polyisocyanurate foam insulation boards that are used in roofing applications may include: a reinforced cellulosic felt facer, an un-coated polymer bonded glass fiber mat, a coated polymer bonded glass fiber mat, and the like. In such embodiments, the facer 104 may include a mineral and/or pigment based coating with high solid content to provide one or more desired characteristics, such as low porosity, fire retardancy, mechanical strength, and the like. The facer 104 may have a thickness of between about 0.3 and 1.2 mm.

Facers for polyisocyanurate foam cover boards that are used in roofing applications may include: coated polymer bonded glass fiber mat, which provides desired characteristics, such as low porosity, fire retardancy, mechanical strength, and the like. In such embodiments, the facer 104 may have a thickness of between about 0.4 and 1.2 mm. Facers for polyisocyanurate foam boards that are used in wall applications may include a metal foil facer that is configured to reflect heat, such as from and/or into a structure, and/or may include an un-coated polymer bonded glass mat, coated polymer bonded glass mat, and the like. In such embodiments, the facer 104 may have a thickness of between about 0.006 and 1.2 mm. The thickness of 0.006 mm typically represents the thickness of a metal facer while the 1.2 mm represents the thickness of other facers.

Although FIG. 1 shows the facer 104 being positioned on a single side of the polyisocyanurate core 102, it should be realized that in many embodiments an additional facer may be positioned on the opposite side of the polyisocyanurate core 102. The additional facer may be a similar or different facer than facer 104 and/or may have a different thickness and/or material coating as desired.

As briefly mentioned above, the polyisocyanurate foam board 100 has an initial R-value of at least 6.40, and commonly between 6.5 and 6.55. This initial R-value is higher than that initially exhibited by conventional polyisocyanurate foam boards. For example, conventional foam boards typically have an initial R-value of about 6.3 and not normally greater than 6.4. As such, the polyisocyanurate foam board composition of the embodiments described herein provide an initial R-value increase of approximately 0.01 to 0.15. The increase in R-value of the polyisocyanurate foam boards described herein may be achieved through a nucleation effect that results in smaller cell size in the foam as described above.

In addition, as described herein, the polyisocyanurate foam board 100 exhibits an ASTM E1354-11b performance equivalent with or better than a similar polyisocyanurate foam board having a halogenated fire retardant, such as tris(2-chloroisopropyl)phosphate (TCPP). The polyisocyanurate foam board 100 commonly has a density of between about 1.45 and 10 lbs/ft$^3$, and more commonly between 1.5 and 7.5 lbs/ft$^3$. In an exemplary embodiment, a polyisocyanurate foam cover board may have a density of between about 4 and 8 lbs/ft$^3$, and more commonly between about 6 and 7 lbs/ft$^3$; a polyisocyanurate foam insulation roofing board may have a density of between about 1.5 and 2.0 lbs/ft$^3$, and more commonly between about 1.6 and 1.7 lbs/ft$^3$; and a polyisocyanurate foam sheathing board may have a density of between about 1.5 and 2.5 lbs/ft$^3$, and more commonly between about 1.6 and 2.0 lbs/ft$^3$.

Figure 2:
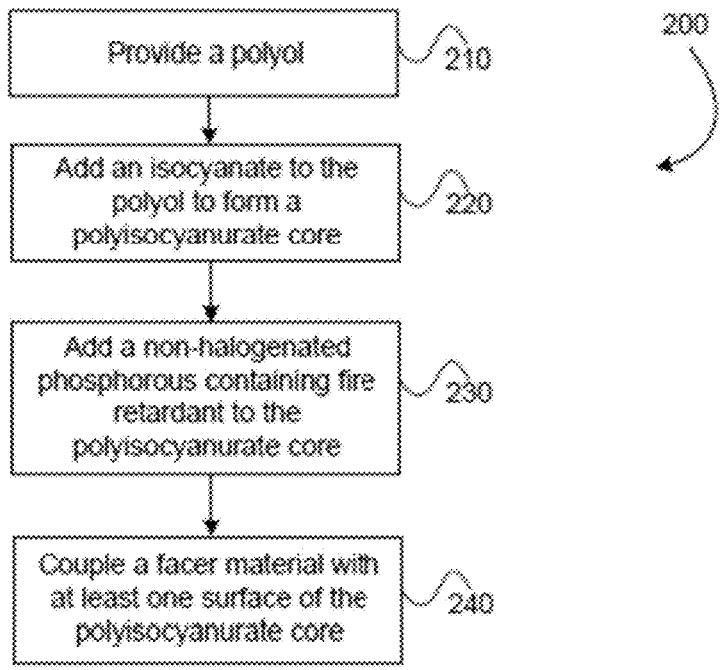
FIG. 2 illustrates a method of forming a polyisocyanurate foam board.

Referring now to FIG. 2, illustrated is a method of forming a polyisocyanurate foam board. At block 210, a polyol is provided. At block 220, an isocyanate is added to the polyol to form a polyisocyanurate core having an isocyanate index greater than about 200. At block 230, a non-halogenated phosphorous containing fire retardant is added to the polyisocyanurate core. As described herein, the composition of the polyisocyanurate foam board enables the polyisocyanurate core to form a sufficiently stable char when exposed to flame conditions in accordance with an ASTM E-84 such that the polyisocyanurate core passes the ASTM E-84 test. At block 240, a facer material is coupled with at least one surface of the polyisocyanurate core. The facer material includes a glass fiber mat, or other mat, that may be selected based on the end application of the polyisocyanurate foam board as described herein. In some embodiments, an additional facer material may be coupled with an opposite surface of the polyisocyanurate core.

The resulting polyisocyanurate foam board may have an R-value of at least 6.40 and may exhibit an ASTM E1354 Cone calorimeter test performance that is equivalent with or better than a similar polyisocyanurate foam board having a halogenated fire retardant, such as tris(2-chloroisopropyl) phosphate (TCPP). In some embodiments, the method may also include adding between 1 and 10 weight percent of a hydrocarbon blowing agent to the polyisocyanurate foam board.

Exemplary Wall Systems

Wall structures or systems of commercial and residential structures are commonly insulated by filling a wall cavity that is positioned between wall studs (wood or metal). The wall cavity may be filled using a spray foam insulation (open cell and/or close cell), Batt or roll insulation (e.g., fiberglass, mineral wool, cotton, and the like), loose fill insulation (e.g., fiberglass, cellulose, mineral wool, and the like), or a combination thereof. Thermal bridging from the wall studs can reduce the effectiveness of the cavity insulation. To reduce the effects of thermal bridging, the wall system or structure may include external sheathing insulation (e.g., continuous external sheathing), such as with a foil faced rigid polyisocyanurate foam board, that is coupled with the cavity insulation.

Figure 3:
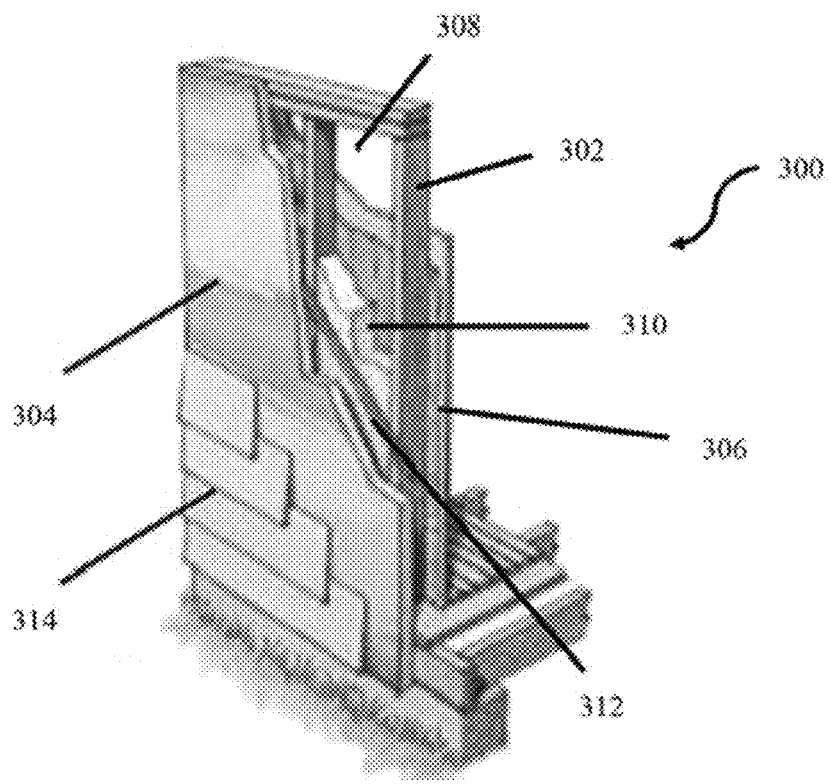
FIG. 3 illustrates an embodiment of a wall system or structure that may be used to insulate a commercial or residential structure.

Referring now to FIG. 3, illustrated is an embodiment of a wall system or structure 300 that may be used to insulate a commercial or residential structure. In some embodiments, wall system 300 may be a substantially halogen free wall system, wherein each or most of the wall system components is free of a halogen fire retardant. Wall system 300 includes a plurality of structural support members or wall studs 302 that are coupled together to form a wall frame. A plurality of foam boards 304 (hereinafter sheathing boards 304) are attached to an exterior side of the frame to form an insulative exterior wall or surface of the wall system 300 (i.e., continuous external sheathing insulation). A plurality of wall boards 306 are attached to an interior side of the frame opposite the sheathing boards 304 to form an interior wall or surface of the wall system 300. In some embodiments, the wall boards 306 are free of a halogenated fire retardant. Exemplary wall boards 306 include gypsum boards and the like. The wall studs 302, sheathing boards 304, and wall boards 306 define a plurality of wall cavities 308.

Fasteners (not shown) are used to attach the sheathing boards 304 and wall boards 306 to the respective sides of the frame. Each fastener may include an elongate shaft that penetrates through a respective board and into a wall stud 302 to couple the components together. Exemplary fasteners include nails and screws, although in some embodiments non-mechanical fasteners may be used, such as adhesives and the like. An insulation material 310 is positioned within at least one of the wall cavities 308 of the wall system, and more commonly within each wall cavity 308 or within most of the wall cavities. The insulation material 310 is positioned within the wall cavity 308 to insulate the building or structure. As described herein, exemplary insulation materials include spray foam insulation (open cell and/or close cell), Batt or roll insulation (e.g., fiberglass, mineral wool, cotton, and the like), loose fill insulation (e.g., fiberglass, cellulose, mineral wool, and the like), or a combination thereof. In some embodiments, the insulation material may be free of a halogenated fire retardant.

In some embodiments, an additional wall board 312 may be attached to the exterior side of the frame. In some embodiments, the additional wall board 312 may be free of a halogenated fire retardant. The additional wall board 312 may be a gypsum board, cement board, oriented strand board (OSB), plywood, and the like. Wall board 312 may be positioned between the sheathing board 302 and frame or wall studs 302 for structural support and/or other purposes. External veneer or cladding 314 (hereinafter exterior cladding 314) may be positioned on an exterior side of the sheathing boards 304. In some embodiments, the exterior cladding 314 may be free of a halogenated fire retardant. The exterior cladding 314 may include brick, stucco, rock, siding, paneling, and the like that provides the structure with an aesthetic appeal while optionally also providing one or more desired mechanical or other characteristics. In some embodiments, a drainage cavity or barrier may be positioned between one or more of the components of the wall system, such as between the exterior cladding 314 and the sheathing boards 304. The wall system 300 may also include other components, layers, and/or materials that are not shown, such as an interior vapor barrier, flashing, primer, and the like.

As described herein, the sheathing board 304 of wall system 300 include a polyisocyanurate core that is produced from: an isocyanate, a polyol, and at least one phosphorus containing non-halogenated fire retardant (e.g., DEHMP). The polyisocyanurate core has an isocyanate index of greater than 200. The polyisocyanurate core composition or formulation enables the polyisocyanurate core to form a sufficiently stable char when exposed to flame conditions in accordance with an ASTM E-84. This enables the polyisocyanurate core to pass the ASTM E-84 test. The polyisocyanurate core foam board also exhibits an initial R-value of at least 6.4, and commonly 6.5 to 6.55, and further exhibits an ASTM E1354-11b test performance that is equivalent with or better than a similar polyisocyanurate foam sheathing board having a halogenated fire retardant, such as tris(2-chloroisopropyl)phosphate (TCPP).

In some embodiments, the sheathing board 304 may also include a foil facer that is attached to an exterior side of the board. The sheathing boards 304 may have a foam density of between about 1.5 and 2.5 lbs/ft$^3$, and more commonly between about 1.6 and 2.0 lbs/ft$^3$. In some embodiments, the polyisocyanurate core also include between 1 and 10 weight percent of a hydrocarbon blowing agent, which may be a highly flammable material as described herein above. The sheathing board more commonly include between about 5 and 8 weight percent of the hydrocarbon blowing agent.

Figure 4:
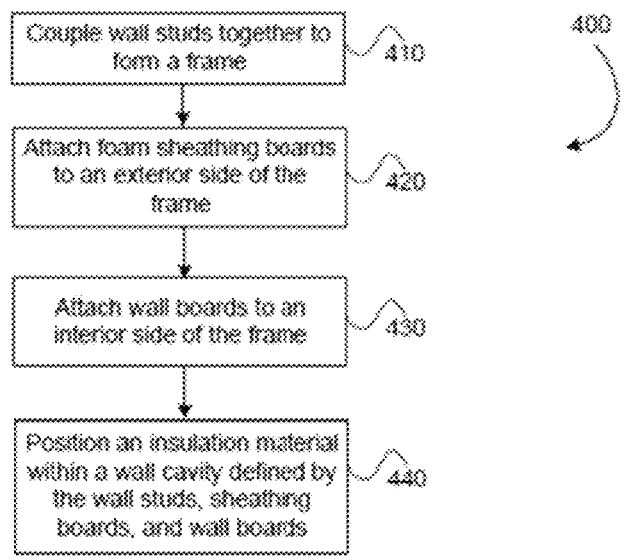
FIG. 4 illustrates a method of forming a wall of a structure.

Referring now to FIG. 4, illustrates is a method of forming a wall of a structure. At block 410, a plurality of structural support (i.e., wall studs) are coupled together to form a frame. At block 420, a plurality of foam boards (i.e., polyisocyanurate sheathing boards) are attached to an exterior side of the frame to form an insulative exterior wall or surface. At block 430, a plurality of wall boards are attached to an interior side of the frame to form an interior wall or surface. The structural support members, foam boards, and wall boards are coupled together to define a plurality of wall cavities. At block 440, an insulation material (e.g., a spray foam material, a fiberglass material, or a combination thereof) is positioned within at least one of the wall cavities, and commonly most or all wall cavities, to insulate an interior space of the structure.

As described herein, at least one of the foam board includes a polyisocyanurate core that is produced from: an isocyanate, a polyol, and at least one phosphorus containing non-halogenated fire retardant. The polyisocyanurate core is configured to form a sufficiently stable char when exposed to flame conditions in accordance with an ASTM E-84 that enables the polyisocyanurate core to pass the ASTM E-84 test. The polyisocyanurate core foam board has an initial R-value of at least 6.4 and exhibits an ASTM E1354-11b performance that is equivalent with or better than a similar polyisocyanurate foam sheathing board having a halogenated fire retardant, such as tris(2-chloroisopropyl)phosphate (TCPP).

In some embodiments, the method also includes applying between 1 and 10 weight percent of a hydrocarbon blowing agent to the polyisocyanurate core. In some embodiments, the method further includes attaching a foil facer to an exterior side of the polyisocyanurate core.

Exemplary Roofing Systems

Commercial and industrial roofing system usually include a combination of layers, such as an insulation layer and a waterproof layer. In some instances, a cover board can be used between the insulation layer and waterproof layer to add fire and/or mechanical protection, such as hail resistance. According to the embodiments herein, a roofing system's insulation layer for commercial and/or industrial roofing includes polyisocyanurate foam boards. The waterproof layer includes a built-up roof, modified bitumen, and/or a single ply membrane, such as thermoplastic olefin (TPO), polyvinyl chloride (PVC), ethylene propylene diene monomer (EPDM), metal, and the like.

Figure 5:
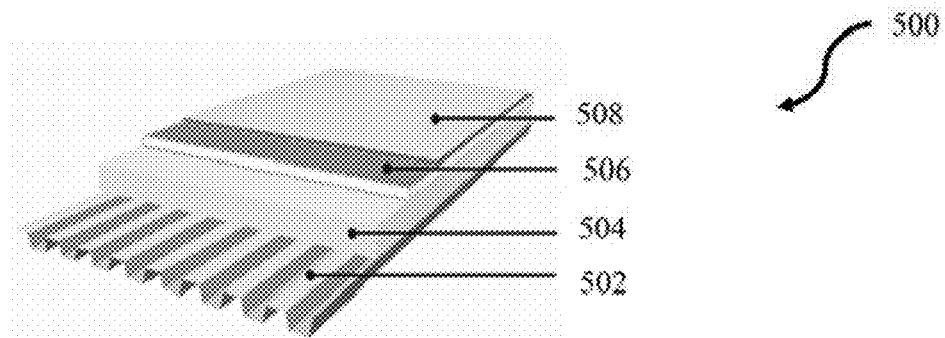
FIG. 5 illustrates a roof deck or system that may be used for a commercial or industrial structure.

Referring now to FIG. 5, a construction of a commercial roof deck (i.e., roof system 500) is shown. In some embodiments, roof system 500 may be a substantially halogen free system, wherein each or most of the roof system components is free of a halogen fire retardant. Roof system 500 includes a structural deck 502, which is commonly made of steel or galvanized metal (18 to 22 gauge), although other types of materials and/or sizes are possible. The structural deck 502 is commonly positioned above steel, metal, or other joists and supported thereby. A plurality of foam insulation boards 504 (hereinafter insulation boards 504) are positioned atop the structural deck 502 to form an insulative layer of roofing system 500. As described herein, the insulation boards 504 are polyisocyanurate foam boards having an isocyanate index greater than 200.

In some embodiments, a plurality of cover boards 506 are positioned atop the insulation boards 504 to add a protective layer to roofing system 500. The covers board 506 may be added for fire and/or mechanical protection (e.g., hail or impact resistance) or for various other reasons. In some embodiments, the cover boards 506 are free of a halogenated fire retardant. As described herein, in some embodiments, the cover boards 506 may include a halogen free high density polyisocyanurate foam board. In other embodiments, the cover boards 506 may include perlite based boards, gypsum based boards, and the like. In some embodiments, the roofing system 500 does not include cover boards 506.

A water proof membrane 508 is positioned atop the roofing system 500. The water proof membrane 508 may be positioned atop the cover boards 506, insulation boards 504, and/or another component/layer of the roofing system 500. In some embodiments, the water proof membrane 508 is free of a halogenated fire retardant. In such embodiments, the water proof membrane 508 may include a built-up roof, modified bitumen, thermoplastic olefin (TPO), ethylene propylene diene monomer (EPDM), metal, and the like. The water proof membrane 508 may be ballasted, adhered, mechanically fastened, and the like atop the roofing system 500 to couple the water proof membrane 508 with the roofing system's components/layers. Further, individual components of the water proof membrane 508 may be coupled together to form the water proof membrane 508. For example, individual TPO segments, sheets, or strips may be heat welded together to form a substantially continuous TPO layer atop the roofing system 500. Similarly, individual EPDM segments may be adhered or bonded together and metal segments may be mechanically fastened or bonded to form a substantially continuous water proof membrane layer.

The roofing system 500 may be slightly sloped to promote drainage of water and/or for various other reasons as desired. The roof system 500 may also include other components, layers, and/or materials that are not shown, such as bonding cement, primer, acoustic infills, and the like.

As described herein, the insulation boards 504 and/or cover boards 506 are polyisocyanurate foam boards that include a polyisocyanurate core having a halogen free fire retardant. The polyisocyanurate core is able to form a sufficiently stable char when exposed to flame conditions in accordance with an ASTM E-84 such that the polyisocyanurate core is able to pass the ASTM E-84 test. The polyisocyanurate core is produced from: an isocyanate, a polyol, and at least one phosphorus containing non-halogenated fire retardant (e.g., DEHMP). The polyisocyanurate core has an isocyanate index of greater than 200. The insulation boards 504 also exhibits an initial R-value of at least 6.4 and further exhibit an ASTM E1354-11b test performance that is equivalent with or better than a similar polyisocyanurate foam insulation roofing board having a halogenated fire retardant, such as tris(2-chloroisopropyl) phosphate (TCPP).

In some embodiments, the insulation boards 504 also includes a facer that is coupled with one or more surfaces of the insulation board 504, commonly both surfaces. The facer typically includes a glass fiber mat, but may include other types of facer materials. The facer may include: a reinforced cellulosic felt facer, an un-coated polymer bonded glass fiber mat, a coated polymer bonded glass fiber mat, and the like. The facer may be coated or uncoated as desired to provide a desired characteristic, such as fire retardancy, mechanical strength, and the like. The insulation board 504 may have a foam density of between about 1.5 and 2.0 lbs/ft$^3$, and more commonly between about 1.6 and 1.7 lbs/ft$^3$. In some embodiments, the insulation board's polyisocyanurate core also includes between 1 and 10 weight percent of a hydrocarbon blowing agent, which may be a highly flammable material as described herein above. The insulation boards 504 commonly include between about 5 and 8 weight percent of the hydrocarbon blowing agent.

In some embodiments, the cover boards 506 also includes a facer that is coupled with one or more surfaces of the cover board 506, commonly both surfaces. The facer typically includes a glass fiber mat, but may include other types of facer materials. The cover board 506 may have a foam density of between about 3 and 8 lbs/ft$^3$, and more commonly between about 6 and 7 lbs/ft$^3$. In some embodiments, the cover board's polyisocyanurate core also includes between 1 and 10 weight percent of a hydrocarbon blowing agent, which may be a highly flammable material as described herein above. The cover boards 506 commonly include between about 1.5 and 3 weight percent of the hydrocarbon blowing agent.

Figure 6:
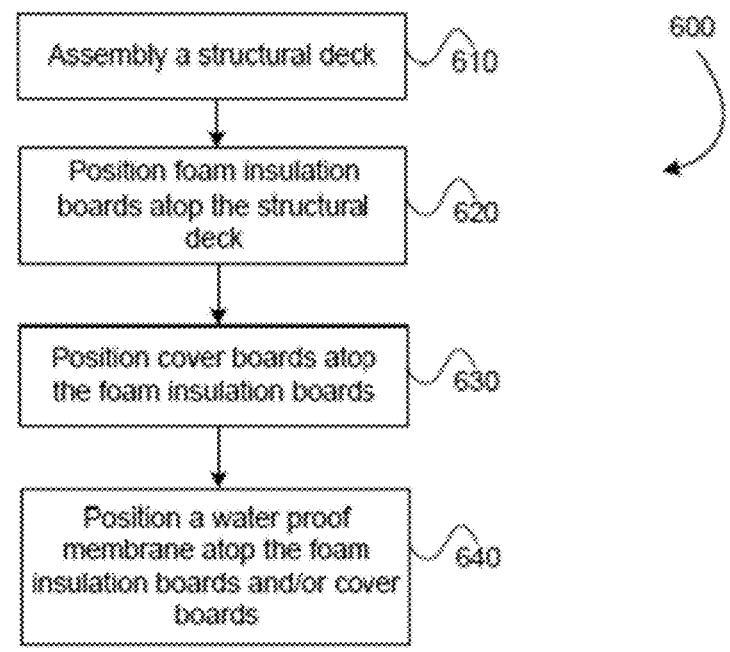
FIG. 6 illustrates a method of forming a roofing system of a structure.

Referring now to FIG. 6, illustrated is a method of forming a roofing system of a structure. At block 610, a structural deck is assembled atop joists (metal and the like) or other structurally supporting members. At block 620, a plurality of foam insulation boards (i.e., polyisocyanurate roof insulation boards) are positioned atop the structural deck to provide an insulation layer for the roofing system. At block 630, a plurality of cover boards are optionally positioned atop the foam insulation boards to form a protective layer for the roofing system. At block 640, a water proof membrane is positioned atop the foam insulation boards and/or cover boards to provide a water proof layer for the roofing system.

As described herein, at least one of the foam insulation boards includes a polyisocyanurate core that is produced from: an isocyanate, a polyol, and at least one phosphorus containing non-halogenated fire retardant. The polyisocyanurate core is configured to form a sufficiently stable char when exposed to flame conditions in accordance with an ASTM E-84 that enables the polyisocyanurate core to pass the ASTM E-84 test. The polyisocyanurate core foam board has an initial R-value of at least 6.4 and exhibits an ASTM E1354-11b performance that is equivalent with or better than a similar polyisocyanurate foam sheathing board having a halogenated fire retardant, such as tris(2-chloroisopropyl) phosphate (TCPP).

In some embodiments, at least one of the cover boards includes a polyisocyanurate core that is produced from: an isocyanate, a polyol, and at least one phosphorus containing non-halogenated fire retardant as described herein. In some embodiments, the method also includes applying between 1 and 10 weight percent of a hydrocarbon blowing agent to the polyisocyanurate core of the foam insulation board(s) and/or cover board(s). In some embodiments, the method further includes attaching a facer to at least one surface of the foam insulation board(s) and/or cover board(s).

Test Results

A typical non-halogenated reactive phosphorus compound containing polyisocyanurate foam formulation is shown in Table 1. The resulting polyisocyanurate foam board is similar to those described herein.

TABLE 1

Non-Halogenated Reactive Phosphorus Compound Containing Polyisocyanurate Foam Formulation

| | % |
|---|---|
| B-side Chemical | |
| Polyester Polyol | 50-75 |
| Metal Catalysts | 4-8 |
| Amine Catalyst | 0.1-0.5 |
| DEHMP | 6-12 |
| Water | 0.1-0.3 |
| Pentane | 10-25 |
| A-side Chemical | |
| Polyisocyanate | 100 |
| Index | 200-350 |

The physical properties of the non-halogenated reactive phosphorus compound containing polyisocyanurate foam, especially DEHMP, are shown in Table 2. Table 2 shows a control sample that is a polyisocyanurate foam containing a halogenated fire retardant (i.e., TCPP), and also show three sample polyisocyanurate foams containing a phosphorous containing non-halogenated fire retardant (i.e., DEHMP): one containing 3% DEHMP, one containing 3.5% DEHMP, and one containing 4.5% DEHMP. The results clearly demonstrate that the addition of DEHMP improves the thermal insulation value (R-value) of the polyisocyanurate foam, likely through cell size reduction. It is believed that the DEHMP is acting as a nucleating agent that minimizes the cell size of the foam.

TABLE 2

Physical Properties of Non-Halogenated Reactive Phosphorus Compound Containing Polyisocyanurate Foam

| Sample # | Density (pcf) | Compressive strength (psi) | Cell Size (μm) | R-Value (initial) |
|---|---|---|---|---|
| Control 4.5% TCPP | 1.59 | 23 | 140 | 6.39 |
| Trial 1 3% DEHMP | 1.66 | 23 | | 6.54 |
| Trial 2 3.5% DEHMP | 1.65 | 23 | | 6.54 |
| Trial 3 4.5% DEHMP | 1.66 | 24 | 115 | 6.51 |

The ASTM E-84 test results are shown in Table 3, which clearly demonstrates that the DEHMP containing polyisocyanurate foams achieve similar or better fire performance than a similar polyisocyanurate foam containing a TCPP fire retardant at the same or lower loading in E-84 tests. In some instances (e.g., smoke development index), the performance of the polyisocyanurate foams containing DEHMP was substantially better than the similar polyisocyanurate foam including the TCPP fire retardant. For example, the second trial containing 3.5% DEHMP exhibited roughly half the smoke development when compared with the control sample containing 4.5% TCPP. The flame spread in the polyisocyanurate foams containing DEHMP was also substantially the same or lower than the exhibited flame spread of the control sample.

TABLE 3

ASTM E-84 Test Results

| Sample # | Density (pcf) | E-84 Flame Spread Index | E-84 Smoke Development Index |
|---|---|---|---|
| Control 4.5% TCPP | 1.59 | 34 | 256 |
| Trial 1 3% DEHMP | 1.66 | 32 | 215 |
| Trial 2 3.5% DEHMP | 1.65 | 35 | 122 |
| Trial 3 4.5% DEHMP | 1.66 | 30 | 200 |

The ASTM E-1354 Cone calorimeter test results are shown in Table 4. The results shown in Table 4 clearly demonstrate that the DEHMP containing polyisocyanurate foams achieve similar or better performance in total heat release, peak heat release, total smoke, and mass loss, at the same or lower loading. The results are surprising since they suggests the free radical scavenging fire retarding function, which halogenated fire retardants provide, can be replaced by improving the char formation and char stability of the polymer network through a reactive organo phosphorus compound. The embodiments described herein focus on the use of non-halogenated reactive organic phosphorus compound in the rigid polyisocyanurate foam formulation to achieve these desired fire retardant properties instead of using the more conventional halogenated fire retardants. The formulation also surprisingly improves the initial thermal insulation value of the resulting foam.

TABLE 4

Cone Calorimeter Test Results (ASTM E1354)

| Sample # | Total Heat Release (MJ/m$^2$) | Average Heat Release (kW/m$^2$) | Peak Heat Release (kW/m$^2$) | Total Smoke (m$^2$/m$^2$) | Mass Loss (%) |
|---|---|---|---|---|---|
| Control 4.5% TCPP | 4 | 70 | 113 | 115 | 46 |
| Trial #1 3% DEHMP | 4 | 68 | 120 | 107 | 54 |
| Trial #2 3.5% DEHMP | 5 | 59 | 107 | 101 | 52 |
| Trial #3 4.5% DEHMP | 4 | 63 | 103 | 91 | 46 |

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A polyisocyanurate foam insulation board comprising:
a polyisocyanurate core produced from reacting:
an isocyanate; and
a polyol, wherein the polyol consists of a polyester polyol;
wherein the polyisocyanurate core includes at least one isocyanate reactive mono-hydroxyl phosphorus containing non-halogenated fire retardant, the polyisocyanurate core forming a sufficiently stable char when exposed to flame conditions in accordance with an ASTM E-84 that enables the polyisocyanurate core to pass the ASTM E-84 test, wherein the polyisocyanurate core foam board comprises an initial R-value of at least 6.4, and wherein the polyisocyanurate core foam board exhibits an ASTM E1354-11b performance equivalent with or better than a polyisocyanurate foam insulation board having a halogenated fire retardant tris(2-chloroisopropyl)phosphate (TCPP);
wherein the polyisocyanurate foam insulation board has an isocyanate index greater than 200.

2. The polyisocyanurate foam insulation board of claim 1, wherein the polyisocyanurate core further comprises between 5 and 10 weight percent of a hydrocarbon blowing agent.

3. The polyisocyanurate foam insulation board of claim 1, wherein the polyisocyanurate foam insulation board further includes a glass fiber mat facer attached to at least one surface thereof.

4. The polyisocyanurate foam insulation board of claim 1, wherein the polyisocyanurate foam insulation board further includes a reinforced cellulosic felt facer attached to at least one surface thereof.

5. The polyisocyanurate foam insulation board of claim 1, wherein the at least one isocyanate reactive mono-hydroxyl phosphorus containing non-halogenated fire retardant includes one or more of:
organo-phosphate;
organo-phosphite; or
organo-phosphonate.

6. The polyisocyanurate foam insulation board of claim 5, wherein the isocyanate reactive mono-hydroxyl phosphorous containing non-halogenated fire retardant is diethyl hydroxymethyl phosphonate (DEHMP).

7. The polyisocyanurate foam insulation board of claim 1, wherein the polyisocyanurate core comprises an average foam cell size of no more than 200 microns.

8. The polyisocyanurate foam insulation board of claim 1, wherein the polyisocyanurate foam insulation board has a density of between about 1.5 and 2.5 lbs/ft$^3$.

9. A polyisocyanurate foam cover board comprising:
a polyisocyanurate core produced from reacting:
an isocyanate; and
a polyol, wherein the polyol consists of a polyester polyol;
wherein the polyisocyanurate core includes at least one isocyanate reactive mono-hydroxyl phosphorus containing non-halogenated fire retardant, the polyisocyanurate core forming a sufficiently stable char when exposed to flame conditions in accordance with an ASTM E-84 that enables the polyisocyanurate core to pass the ASTM E-84 test, wherein the polyisocyanurate foam cover board exhibits an ASTM E1354-11b performance equivalent with or better than a polyisocyanurate foam cover board having a halogenated fire retardant tris(2-chloroisopropyl)phosphate (TCPP);
wherein the polyisocyanurate foam cover board has an isocyanate index greater than 200.

10. The polyisocyanurate foam cover board of claim 9, wherein the polyisocyanurate core further comprises less than 5% of a hydrocarbon blowing agent by weight.

11. The polyisocyanurate foam cover board of claim 9, wherein the polyisocyanurate foam cover board further includes a glass fiber mat facer attached to at least one surface thereof.

12. The polyisocyanurate foam cover board of claim 9, wherein the at least one isocyanate reactive mono-hydroxyl phosphorus containing non-halogenated fire retardant includes one or more of:
organo-phosphate;
organo-phosphite; or
organo-phosphonate.

13. The polyisocyanurate foam cover board of claim 12, wherein the isocyanate reactive mono-hydroxyl phosphorous containing non-halogenated fire retardant is diethyl hydroxymethyl phosphonate (DEHMP).

14. The polyisocyanurate foam cover board of claim 9, wherein the polyisocyanurate core comprises an average foam cell size of no more than 200 microns.

15. The polyisocyanurate foam cover board of claim 9, wherein the polyisocyanurate foam cover board has a density of up to 10.0 lbs/ft$^3$.

16. A method of forming a polyisocyanurate foam board comprising:
reacting an isocyanate with a polyol to form a polyisocyanurate core, wherein the polyol consists of a polyester polyol; and
applying at least one isocyanate reactive mono-functional phosphorus containing non-halogenated fire retardant to the polyisocyanurate core so that the polyisocyanurate core forms a sufficiently stable char when exposed to flame conditions in accordance with an ASTM E-84 that enables the polyisocyanurate core to pass the ASTM E-84 test, wherein the polyisocyanurate foam board exhibit an ASTM E 1354-11b performance equivalent with or better than a polyisocyanurate foam board having a halogenated fire retardant tris(2-chloroisopropyl)phosphate (TCPP).

17. The method of claim 16, wherein the polyisocyanurate foam board includes a reinforced cellulosic felt facer attached to at least one surface thereof.

18. The method of claim 16, wherein the polyisocyanurate core further comprises between 1 and 10 weight percent of a hydrocarbon blowing agent having a Lower Explosive Limit (LEL) of less than 2%.

19. The method of claim 16, further comprising attaching a glass fiber mat facer to at least surface of the polyisocyanurate core.

20. The method of claim 16, wherein wherein the non-halogenated fire retardant comprises one or more of the following fire retardants:
diethyl hydroxymethyl phosphonate;
dimethyl hydroxylmethylphosphonate; or
diphenyl hydroxymethylphosphonate.

21. The method of claim 16, wherein the polyisocyanurate foam board has a density of up to 10.0 lbs/ft$^3$.

* * * * *